UNITED STATES PATENT OFFICE.

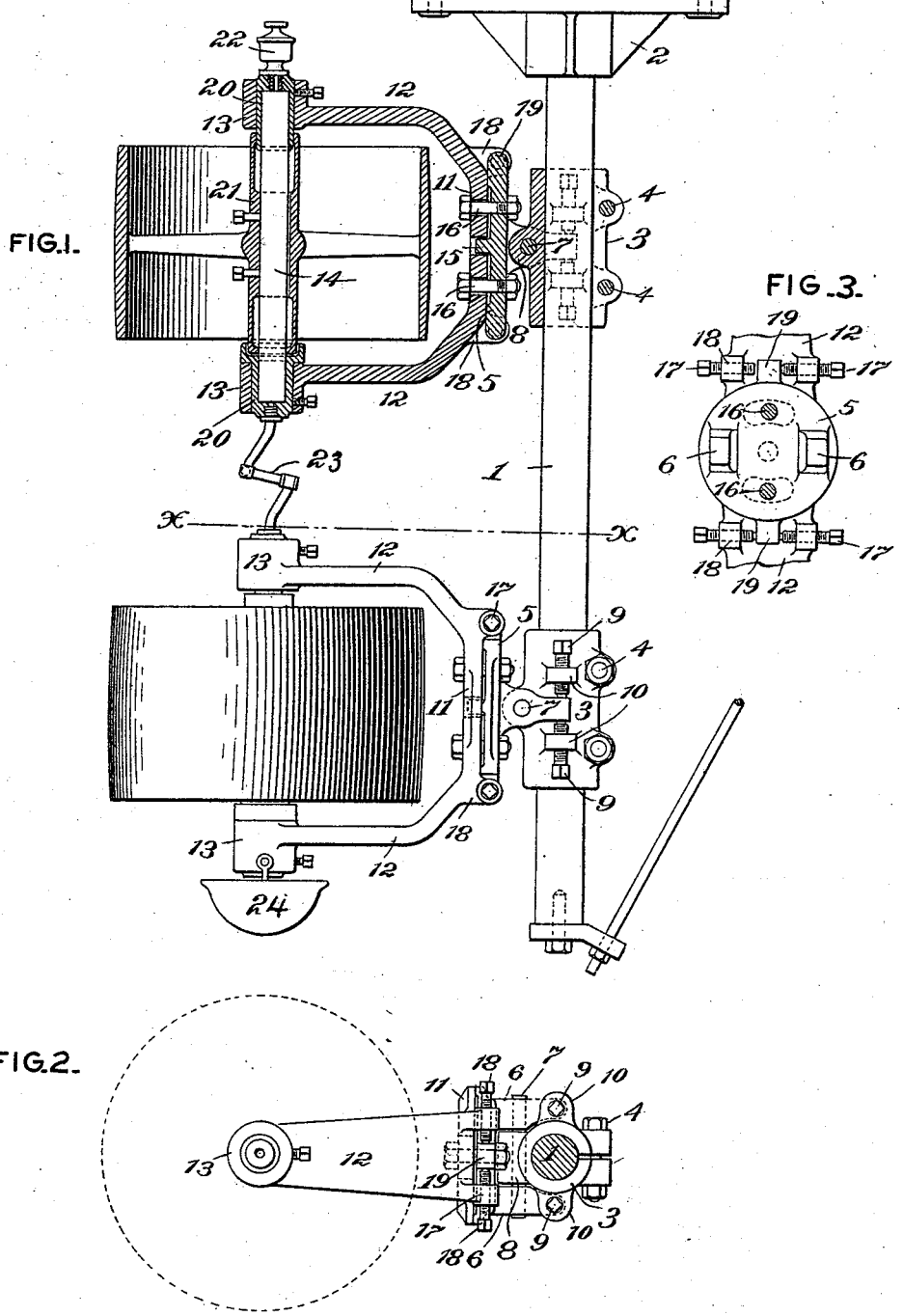

GEORGE H. GEYER, OF PITTSBURG, PENNSYLVANIA, ASSIGNOR TO JONES & LAUGHLINS, LIMITED, OF SAME PLACE.

GUIDE-PULLEY.

SPECIFICATION forming part of Letters Patent No. 525,319, dated August 28, 1894.

Application filed June 4, 1894. Serial No. 513,388. (No model.)

*To all whom it may concern:*

Be it known that I, GEORGE H. GEYER, a citizen of the United States, residing at Pittsburg, in the county of Allegheny and State of Pennsylvania, have invented or discovered certain new and useful Improvements in Guide-Pulleys, of which improvements the following is a specification.

The invention described herein relates to certain improvements in the manner of mounting guide pulleys and has for its object such a construction of the pulley supports as will permit of any desired angular adjustment of the pulleys with reference to each other and to the direction of the belt to be guided.

In general terms the invention consists in the construction and combination, substantially as hereinafter more fully described and particularly claimed.

In the accompanying drawings, forming a part of this specification, Figure 1 is a view partly in elevation and partly in section of my improvement. Fig. 2 is a top plan view of the connections from the pulley frame or yoke to the supporting standard, and Fig. 3 is an end view of the pulley frame.

In the practice of my invention the post 1 is secured in any suitable manner to the supporting plate 2, and on the post are placed the split sleeves 3 which are adapted to be tightly clamped around the posts by bolts 4 passing through ears on the sleeves.

A frame consisting of a plate or disk 5 and arms 6 projecting from one side of the plate is pivotally mounted on each sleeve 3 by a bolt 7, passing through the arms and a lug or projection 8 on the sleeve. The movements of the frame on its pivotal bolt 7 are regulated by set screws 9 passing through lugs 10 on the sleeves 3 and bearing at their inner ends upon the arms 6, which extend across the sleeves on opposite sides thereof, as shown in Figs. 1 and 2.

Each of the yokes carrying the pulleys consists of a plate or disk 11 and arms 12 provided at their outer ends with bearings 13 for the pulley shaft 14. The plates or disks 5 are provided with central pins 15, adapted to enter central openings in the plates or disks 11 and serve as pivotal supports for the latter which are held in position on the disks 5, by bolts 16 passing through holes in both plates or disks. The bolt holes in one or both of the disks are elongated to permit of the partial rotation of the disk 11. The rotation or axial adjustment of the yokes is effected or controlled by set screws 17 passing through ears 18 on the yokes and bearing at their inner ends upon radial lugs 19, on the plates or disks 5, as shown in Figs. 2 and 3.

By sliding the sleeves 3 along the post or standard, the pulleys can be adjusted toward and from each other, while by adjusting the yokes and frames the pulleys can be shifted to any desired angular position with relation to each other.

The ends of the shafts 14 are arranged in cup-shaped bearing sockets 20, formed of Babbitt or other suitable metal and secured within the bearings 13 of the yokes. The end of the upper socket of each pulley projects down into a recess in the upper end of the hub 21 of the pulley, while the lower end of the hub projects into the lower socket. Oil is fed into the upper socket from any suitable form or construction of oilcup 22, and flows thence into the recess in the upper end of the hub of the pulley, whence it passes by a groove formed in the hub, into the lower socket 20. If desired, the lower socket 20 of the upper pulley can be connected to the upper socket of the lower pulley by a pipe 23 having suitable joints to permit of the adjustment of the pulleys as hereinbefore described. A drip pan 24 is suspended from the lower bearing of the lower pulley to catch any oil that may escape from the lower bearing socket.

I claim herein as my invention—

1. The combination of a post or support, a sleeve adjustable along the post or support, a frame pivotally mounted on the sleeve, and a yoke provided with suitable bearings and adjustably connected to the frame, and a pulley mounted in said bearings, substantially as set forth.

2. The combination of a pulley, a shaft passing through the hub of the pulley, bearing sockets fitting over the ends of the shaft, the socket at one end projecting into a recess in the end of the hub, the opposite end of the hub fitting into the other socket, the sockets being connected by a groove parallel or approximately so with the axis of the pulley, substantially as set forth.

3. The combination of two pulleys arranged one above the other, bearing sockets arranged on the ends of the shafts of said pulleys, connections for the flow of lubricant from the upper to the lower socket of each pulley, and a pipe or tube connecting the lower socket of one pulley with the upper socket of the other pulley, substantially as set forth.

In testimony whereof I have hereunto set my hand.

GEORGE H. GEYER.

Witnesses:
DARWIN S. WOLCOTT,
F. E. GAITHER.